United States Patent [19]

Pounder

[11] 4,173,144
[45] Nov. 6, 1979

[54] LOW FLOW RATE TRANSDUCER CONSTRUCTION

[75] Inventor: Edwin Pounder, La Canada, Calif.
[73] Assignee: Transdynamics, Burbank, Calif.
[21] Appl. No.: 892,949
[22] Filed: Apr. 3, 1978
[51] Int. Cl.² ............................................. G01F 1/06
[52] U.S. Cl. ................................................... 73/229
[58] Field of Search ...................... 73/229, 202, 272 R

[56] References Cited

U.S. PATENT DOCUMENTS

| 1,958,223 | 5/1934 | Yates | 73/272 R |
|---|---|---|---|
| 2,078,057 | 4/1937 | Chirca | 73/229 |
| 2,906,121 | 9/1959 | Knauth | 73/229 |
| 3,465,586 | 9/1969 | Johnston | 73/229 |
| 3,531,988 | 10/1970 | Casani et al. | 73/187 |
| 3,937,081 | 2/1976 | Dabanian et al. | 73/229 |

FOREIGN PATENT DOCUMENTS

| 591369 | 1/1934 | Fed. Rep. of Germany | 73/229 |
|---|---|---|---|
| 2502599 | 7/1976 | Fed. Rep. of Germany | 73/229 |
| 509808 | 3/1952 | France | 73/229 |

*Primary Examiner*—Anthony V. Ciarlante
*Attorney, Agent, or Firm*—Fulwider, Patton, Rieber, Lee & Utecht

[57] ABSTRACT

A transducer construction for sensing very low fluid flow rates by providing an extremely lightweight paddle wheel rotatable within a close fitting fluid chamber having inlet and outlet ports directed toward the paddle wheel with a minimum angular separation between the axes of the ports to insure maximum circumferential contact of the fluid with the paddle wheel as it moves around the fluid chamber. Rotation of the paddle wheel is sensed by means of a light source and photosensitive device placed on opposite end walls of the fluid chamber to detect the passage of the paddles of the paddle wheel therebetween. A modular form of the paddle wheel and photo detector assembly is disclosed.

8 Claims, 4 Drawing Figures

LOW FLOW RATE TRANSDUCER CONSTRUCTION

BACKGROUND OF THE INVENTION

1. Field of the Invention

The present invention relates generally to fluid flow sensors and, more particularly, to such a sensor for detecting very low flow rates.

2. Description of the Prior Art

In the field of flow rate sensing and monitoring, a well-known form of sensing device takes the form of a paddle wheel inserted into the stream of fluid flow with the rate of rotation of the paddle wheel being proportional to fluid flow and electronically sensed and processed to produce an indication of the rate of fluid flow. In some applications, the paddle wheel sensor is inserted into a relatively large pipe or conduit through which the fluid flows. For other applications utilizing relatively small conduits and tubing, the paddle wheel sensor is a separate element through which the fluid itself flows. In certain of such applications, particularly when very low fluid flow rates are to be sensed, special constructions are employed to insure that the paddle wheel rotates in accordance with the actual fluid flow, even though the fluid velocity is relatively small.

Two prior art constructions for the detection of relatively low fluid flow rates are illustrated by the patents to Wemyss U.S. Pat. No. 3,866,469 and Blise et al U.S. Pat. No. 3,981,194, in which the fluid inlets and outlets are on the same side of a fluid chamber containing the paddle wheel and the inlet and outlet are in relatively close proximity to each other. In such a construction, the fluid flow around the paddle wheel is essentially circumferential in that the fluid maintains a reactive contact with the paddle wheel for a substantial portion of the rotation of the wheel.

While such prior art constructions have utilized basic concepts needed for the measurement of very low fluid flow rates, such as substantially circumferential rather than tangential fluid reaction with the paddle wheel, such constructions have not been entirely satisfactory for accurately and linearly measuring flow rates in the range of 20 to 40 milliliters per minute, as is required in certain critical applications such as kidney dialysis machines. Additionally, such prior art constructions typically employ paddle wheel constructions which introduce interruptions in the fluid flow as the paddle rotates past the fluid inlets and are unbalanced because of the necessity of metallic substances in one of the paddle wheels for the sensing technique employed.

Thus, in the area of the critical measurement of relatively low fluid flow rates, such as in the 20 to 40 milliliter range, there has been a need for a substantially linear and accurate sensor for measuring fluid flow. The present invention satisfies that need.

SUMMARY OF THE INVENTION

The present invention provides a low fluid flow rate transducer or sensor construction which accurately linearly and with minimal interference with the fluid flow measures the flow rate through a tube or conduit. A low inertia paddle wheel which is substantially completely balanced is rotatably mounted within a relatively close fitting fluid chamber and fluid inlet and outlet conduits and ports are provided which are placed as close together as possible so that maximum circumferential contact of the fluid with the paddle wheel is effected. In particular, the angle between the axes of the inlet and outlet conduits is made as small as physically possible in a practical construction and, in a presently preferred embodiment is approximately 20°. The axes of the inlet and outlet conduits and ports are angled into the fluid chamber, partly to provide inlet and outlet ports which are as close together as possible and partly to direct the direction of the fluid flow optimally toward the paddle wheel.

The paddle wheel has a plurality of paddles which are essentially spaced from the axle by an aperture so that there is minimal interference with the free flow of fluid from the inlet to the outlet around the fluid chamber. In this manner, the paddle wheels react with the freely flowing fluid and do not appreciably interrupt that fluid stream nor impart any pulsations due to the paddles themselves passing the inlet and outlet ports.

The rate of rotation of the paddle wheel is optically sensed by means of a liquid source such as a light emitting diode mounted on one end wall of a cylindrical fluid chamber which cooperates with a photosensitive device such as a photo transistor mounted in the other end wall of the fluid chamber. Both the light emitting diode and the photo transistor are isolated from the fluid chamber itself with the light being transmitted through transparent windows in the end walls of the chamber. The paddles interrupt the light beam and the resultant pulses are electronically processed by conventional means to develop an indication of the flow rate which is dependent upon the rate of rotation of the paddle wheel.

In one form of construction for the flow rate sensor of the present invention, the paddle wheel and portions of the light source and photo sensitive device are mounted in a detachable module having orifices for mating with the inlet and oulet ports of the housing so that the paddle wheel assembly may be removed for cleaning or maintenance without disturbing the relative position of the bearings supporting the axle of the paddle wheel.

These and other features of the present invention will become apparent from a consideration of the drawings and the detailed description below.

DESCRIPTION OF THE PREFERRED EMBODIMENT

Figure 1:
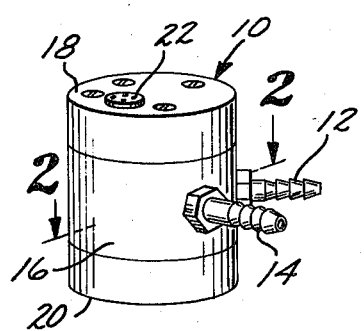
FIG. 1 is a perspective view of the external appearance of a flow rate sensor constructed in accordance with the present invention.

Turning now to the drawings, and particularly FIG. 1 thereof, the external configuration of a transducer or sensor 10 which incorporates the features of the present invention is illustrated. Basically, the sensor 10 is adapted to determine the rate of flow of fluid in a flexible conduit or tubing (not shown), the tubing being connected first to an inlet hose fitting 12 and the fluid being taken from an outlet hose fitting 14. Generally, the sesnor 10 includes a main housing 16 with a pair of end caps 18 and 20 having a connector 22 or the like for electrically connecting the sensor to a conventional processing unit (not shown) which generates an analog or digital indication of the flow through the sensor. An analog processor for utilization with the sensor 10 is available from Signet Scientific Company, 129 East Tujunga Avenue, Burbank, Calif. 91510, as Catalog No. MK305.

Figure 2:
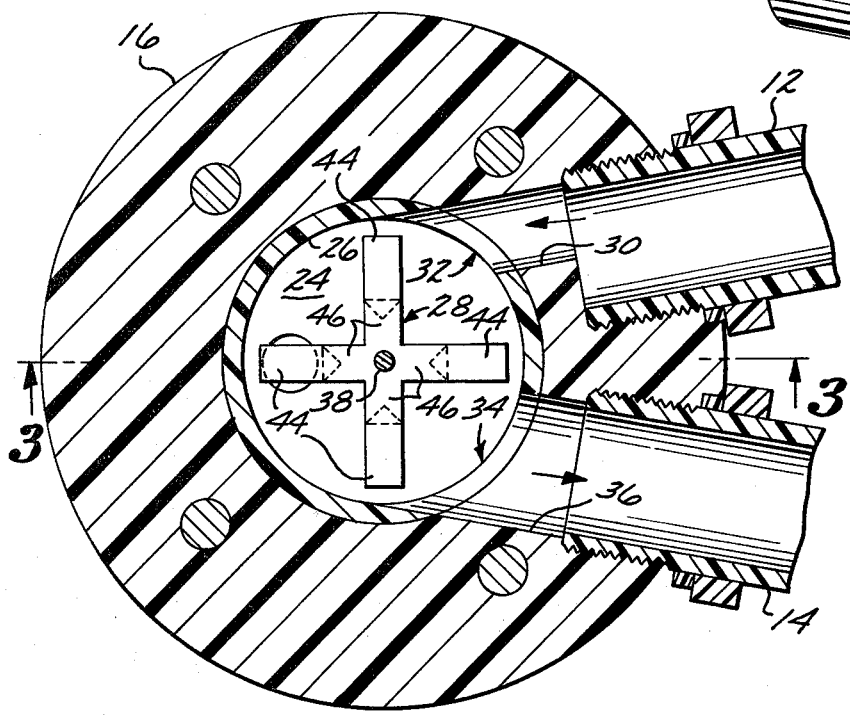
FIG. 2 is an enlarged sectional view of the sensor taken in the direction of line 2—2 of FIG. 1.

FIG. 2 is a cross sectional view of the housing 16 illustrating the internal construction of the sensor 10. Basically, the housing 16 has an internal cylindrically shaped fluid chamber 24 with a cylindrical side wall 26 in which is rotatably mounted a paddle wheel assembly or paddle wheel 28. Fluid enters the fluid chamber 24 through an inlet conduit 30 which terminates at the fluid chamber 24 in an inlet port 32 and fluid leaves the chamber through an outlet port 34 which communicates with an outlet conduit 36 arranged tangentially with respect to the cylindrical well of the fluid chamber 24. Inlet conduit 30 and outlet conduit 36 are conventionally terminated with threaded hose fittings 12 and 14, respectively, as discussed above. The angle between the axes of the inlet and outlet conduits 30 and 36 is made acute and as small as physically possible, which in the presently preferred embodiment is approximately 20°.

Figure 3:
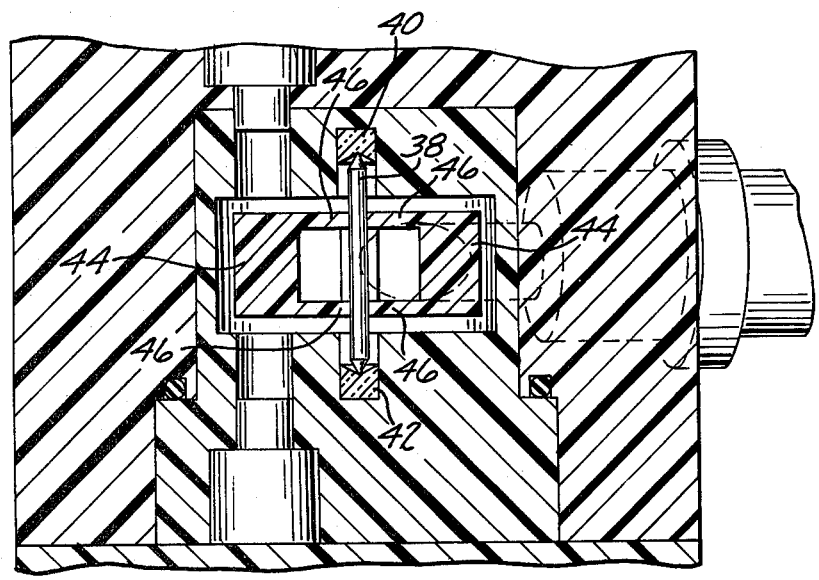
FIG. 3 is a fragmentary sectional view of the sensor taken in the direction of line 3—3 of FIG. 2.

Paddle wheel 28 is rotatably mounted on an axle 38 whose ends are set in jeweled bearings 40 and 42, as best illustrated in FIG. 3. Paddle wheel 28 is constructed with four paddle assemblies each comprising a paddle 44 and struts 46. Each paddle 44 is mounted to the axle 38 by means of the struts 46, which are integral with the axle 38 and the associated paddle 44.

With reference to FIGS. 2 and 3, an imaginary longitudinal extension of the inlet conduit 30 into the fluid chamber 24 defines what is for convenience hereinafter referred to as an "inlet stream tube."

The mounting of each paddle 44 on the axle 38 by means of the struts 46 provides an aperture between the paddle and the axle, the purpose of which is to prevent intermittent or pulsating flow of fluid through the fluid chamber 24. This reduction in the interruption of the flow of fluid into the chamber 24 is due to the fact that as each paddle 44 passes the inlet port 32 and assumes a stream tube position in which it is normal to the axis of the conduit 30 and intersects substantially all of the inlet stream tube, as best seen in FIGS. 2 and 3, the fluid may flow through the apertures to substantially reduce interruption of the relatively low volume of fluid flow for which this particular sensor is designed.

In addition, the paddle wheel 28 itself is balanced due to the fact that its rotation is optically sensed and there is no requirement for any metallic substance in the paddles 44. To further reduce the inertia of the paddle wheel 28, it is constructed of a plastic material such as one of the polypropolene plastics which has a density very close to that of water and, consequently, very close to that of most of the fluids which will flow through the sensor. Thus, the position of the paddle wheel 28 within the fluid chamber 24 is not significantly affected by the position of the sensor 10.

As briefly noted above, the rotational rate of the paddle wheel 28 is optically sensed by means of a light source which transmits a light beam to a photosensitive device, the light beam being periodically interrupted by a paddle 44 passing between the light source and the photosensitive device. In the illustrated preferred embodiment of the invention, the light source and photosensitive device are isolated from the fluid chamber 24 by means of optically transparent windows 48 and 50 positioned in the end walls 51 and 53 of the fluid chamber 24. Adjacent the window 48 is a conventional light emitting diode positioned within a suitable housing (not shown) to transmit a light beam through the window 48 toward the window 50. Mounted behind the window 50 is a light sensor housing (not shown) is a conventional photo transistor positioned to receive the transmitted light beam.

As discussed above, the interrupted light beam from the light emitting diode results in pulsations received by the photo transistor, such pulsations being conventionally electronically processed to produce an indication of flow rate which may be either displayed as an analog signal or as a digital display. Additionally, for particular applications, such as kidney dialysis machines, such signals may be processed further to provide warning indications or to regulate the rotational rate of a pump which provides the fluid flow. It should be appreciated that once the pulsations from the photo transistor are generated for relatively low fluid flow rates, the pulsations may be processed and utilized in numerous ways which are not a part of the subject matter of the present invention.

Figure 4:
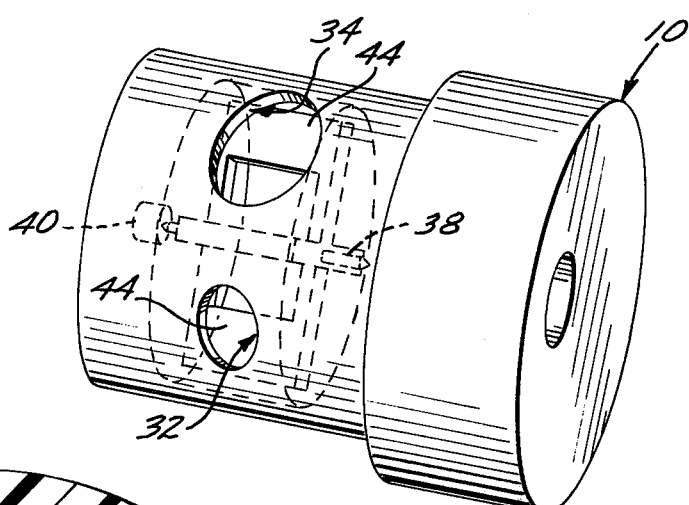
FIG. 4 is a perspective view of a modular construction of the paddle wheel assembly for use in the sensor of the present invention.

In a presently preferred embodiment of the invention, the paddle wheel assembly as well as the windows 48 and 50 are mounted in a module 56 such as that illustrated in FIG. 4. The module includes a cylindrical wheel housing 58 in which is mounted the paddle wheel 28 as well as the windows 48 and 50 (not shown). One end of the wheel housing 58 is terminated with a mounting disc 60 of increased diameter by which the wheel housing 58 is fixed within the main housing 16 to form the fluid chamber 24. An inlet orifice 62 and an outlet orifice 64 are provided in the wheel housing 58 to mate with the inlet and outlet ports 32 and 34, respectively, when the module 56 is placed within the main housing 16. Correct orientation of the orifices 62 and 64 with the inlet and outlet ports 32 and 34, respectively, may be provided by the mounting screws 66, seen in FIG. 2, through the main housing 16 which may be configured to fasten the main housing 16, end caps 18 and 20 and the module 56 together.

Thus, the fluid flow rate sensor construction of the present invention includes a number of unique features which permit it to sense very low fluid flow rates without appreciably interrupting the fluid flow. These features include inlet and outlet conduits 30 and 36, respectively, which are inclined at a minimal angle with respect to each other to direct the fluid flow optimally toward the paddle wheel 28 which is itself constructed so as to minimize the interruption of the fluid flow, such as the apertures between the paddles 44 and the axle 38. In addition, the paddle wheel 28 is constructed of a lightweight plastic material having a density close to that of the fluids flowing through the fluid chamber 24 to minimize the inertial effects of the paddle wheel. Furthermore, the rotation of the paddle wheel 28 is optically sensed, essentially from outside of the fluid chamber 28, so that the paddle wheel 28 may be substantially balanced.

A further feature of the presently preferred invention is the use of a module 56 which contains the permanently mounted paddle wheel 28, its bearings 40 and 42 and the transparent windows 48 and 50. This modular construction permits the fluid chamber 24 and paddle wheel 28 to be removed periodically for servicing and maintenance without disturbing the delicate positions of the bearings 40 and 42 or the paddle wheel 28.

While a presently preferred embodiment of the fluid flow rate sensor construction has been described in detail, it should be appreciated that modifications of the basic concepts involved may be made and that the invention is not to be limited except by the following claims.

I claim:

1. A fluid flow rate sensor construction comprising:
   a housing having a cylindrical wall and opposite end walls defining a cylindrical fluid chamber;
   inlet and outlet conduits extending tangentially through said cylindrical wall to define inlet and outlet ports, an imaginary longitudinal extension of said inlet conduit into said fluid chamber defining an inlet stream tube;
   a paddle wheel assembly rotatably mounted in said fluid chamber and including a hub and a plurality of paddle assemblies extending radially from said hub, each of said paddle assemblies comprising a paddle and strut means connecting said paddle to said hub in spaced relation to define an aperture between said paddle and said hub, each said paddle on rotation of said paddle wheel assembly successively assuming a stream tube position wherein said paddle intersects substantially all of said imaginary longitudinal extension of said inlet conduit, said aperture providing a passageway for fluid flow past said paddle thereby to prevent pulsating fluid flow through said outlet conduit;
   a light source mounted in one of said end walls and spaced from the axis of rotation of said paddle wheel assembly; and
   a photosensor mounted in the opposite one of said end walls for receiving light from said light source, the interruption of said light by said paddle assemblies initiating electrical signals indicative of the rate of rotation of said paddle wheel assembly.

2. The fluid flow rate sensor construction defined in claim 1, wherein:
   said light source and said photosensor are isolated from said fluid chamber by optically transparent windows mounted in said end walls, respectively.

3. The fluid flow rate sensor construction defined in claim 1, wherein:
   said paddle wheel assembly is constructed of a material having a density substantially that of water.

4. The fluid flow rate construction defined in claim 4, wherein:
   said material is a polypropolene plastic material.

5. The fluid flow rate sensor construction defined in claim 1 wherein:
   said housing includes a module embodying said fluid chamber, said paddle wheel assembly, and inlet and outlet orifices communicating with said inlet and outlet ports.

6. The fluid for rate sensor construction defined in claim 1, wherein:
   the angle between the axes of said inlet and outlet conduits is twenty degrees.

7. A fluid flow sensor construction comprising:
   a housing having a cylindrical wall and opposite end walls defining a cylindrical chamber;
   inlet and outlet conduits extending tangentially through said cylindrical wall to define inlet and outlet ports, the longitudinal axes of said inlet and outlet conduits being disposed at an acute angle relative to one another, an imaginary longitudinal extension of said inlet conduit into said chamber defining an inlet stream tube; and
   a paddle wheel assembly rotatably mounted in said chamber and including a hub and a plurality of paddle assemblies extending radially from said hub, each of said paddle assemblies comprising a paddle and strut means connecting said paddle to said hub in spaced relation to define an aperture between said paddle and said hub, each said paddle on rotation of said paddle wheel assembly successively assuming a stream tube position wherein said paddle intersects substantially all of said imaginary longitudinal extension of said inlet conduit, said aperture providing a passageway for fluid flow past each said paddle thereby to prevent pulsating fluid flow through said outlet conduit.

8. A fluid flow sensor construction according to claim 7 wherein:
   said paddle wheel assembly is made of a material having a density substantially equal to the density of water.

* * * * *

UNITED STATES PATENT AND TRADEMARK OFFICE
CERTIFICATE OF CORRECTION

PATENT NO. : 4,173,144
DATED : November 6, 1979
INVENTOR(S) : Edwin Pounder

It is certified that error appears in the above-identified patent and that said Letters Patent are hereby corrected as shown below:

Column 3, line 15, insert "tangentially" between the words "which" and "terminates".

Column 6, line 5, claim 4, "4" should be changed to "3".

Signed and Sealed this

Fifth Day of August 1980

[SEAL]

Attest:

SIDNEY A. DIAMOND

*Attesting Officer*          *Commissioner of Patents and Trademarks*